(12) United States Patent
Ishikawa

(10) Patent No.: US 10,751,887 B2
(45) Date of Patent: Aug. 25, 2020

(54) LINK MECHANISM

(71) Applicant: HONDA MOTOR CO., LTD., Tokyo (JP)

(72) Inventor: Tetsuya Ishikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 16/367,990

(22) Filed: Mar. 28, 2019

(65) Prior Publication Data
US 2019/0299425 A1 Oct. 3, 2019

(30) Foreign Application Priority Data
Mar. 30, 2018 (JP) .................. 2018-066573

(51) Int. Cl.
| B25J 17/00 | (2006.01) |
| B25J 17/02 | (2006.01) |
| B25J 18/00 | (2006.01) |
| B25J 9/12 | (2006.01) |

(52) U.S. Cl.
CPC .......... B25J 17/0258 (2013.01); B25J 9/126 (2013.01)

(58) Field of Classification Search
CPC .... B25J 17/0258; B25J 19/068; B25J 9/1641; B25J 9/1005; B25J 17/0241; B25J 17/0208
USPC ....................................... 74/45, 49
See application file for complete search history.

(56) References Cited

U.S. PATENT DOCUMENTS

| 3,561,614 A * | 2/1971 | Tezuka .................. B21D 43/02 198/750.11 |
| 5,502,363 A * | 3/1996 | Tasch ......................... B25J 9/12 318/568.1 |
| 5,667,325 A * | 9/1997 | Millard .................... B64G 1/22 182/41 |
| 9,889,556 B2 * | 2/2018 | Kim ......................... B25J 9/042 |
| 10,508,721 B1 * | 12/2019 | Hasara .................... F16H 21/44 |
| 2008/0205975 A1 * | 8/2008 | Van Ham ............... B25J 19/068 403/81 |
| 2013/0178297 A1 * | 7/2013 | Pane ...................... B25J 19/068 464/66.1 |
| 2016/0082603 A1 * | 3/2016 | Schimmels ........... B25J 9/1005 267/158 |
| 2017/0129102 A1 * | 5/2017 | Kim ....................... B25J 19/068 |

FOREIGN PATENT DOCUMENTS

JP 2016-074055 5/2016

* cited by examiner

*Primary Examiner* — Jake Cook
(74) *Attorney, Agent, or Firm* — Rankin, Hill & Clark LLP

(57) ABSTRACT

A link mechanism (10) has a first main link (11) and a second main link (21), which are coupled by a joint (31). The link mechanism (10) includes: a pivot bar (41) which has one end pivotably attached at a position in the second main link (21), the position opposing the joint (31), along a plane that is orthogonal to a rotating shaft of the joint (31), and which extends toward the joint (31) from the one end; a slider (42) provided on the pivot bar (41) slidably along the pivot bar (41); a moving mechanism (50) which has one end coupled to the joint (31) and the other end coupled to the slider (42) to move the slider (42); and elastic members (43) which are connected to the pivot bar (41) and the second main link (21) to urge the pivot bar (41) toward a neutral position.

8 Claims, 3 Drawing Sheets

LINK MECHANISM

BACKGROUND OF THE INVENTION

1. Field of the Invention

The present invention relates to a link mechanism having two links coupled by a joint.

2. Description of the Related Art

Hitherto, there has been known a link mechanism of a robot or the like, in which a first link and a second link are connected by a joint and the second link is pivoted with respect to the first link by the driving force of an electric actuator disposed at a joint section (refer to, for example, Patent Document 1).

Patent Document 1: Japanese Patent Application Laid-Open No. 2016-74055

According to the link mechanism described in Patent Document 1, the driving force of the joint for causing the second link to pivot with respect to the first link is determined by the driving force of the electric actuator. More specifically, a torque sensor is disposed at the joint section, and the driving force of the electric actuator is controlled by a controller on the basis of a detection value detected by the torque sensor.

Meanwhile, in a link mechanism of a robot, the stiffness of the second link with respect to the first link is preferably changeable. When the pivoting movement of the second link with respect to the first link is stopped, the second link is desired to remain stationary with respect to the first link even if an external force is applied to the second link or the second link is desired to pivot with respect to the first link if an external force of the same magnitude is applied, depending on external circumstances.

However, according to the configuration described in Patent Document 1, the driving force of the electric actuator is merely transmitted to the joint (a strain inducing member) through a speed reducer from the rotating shaft of the electric actuator, thus making it difficult to change the force for maintaining the pivot of the second link with respect to the first link (the stiffness of the joint) according to external circumstances. Further, to change the stiffness of the joint, a transmission actuator is required to be actuated after receiving a signal of the torque sensor of the joint, so that an action will be inconveniently delayed in response to external circumstances.

SUMMARY OF THE INVENTION

In view of the above, an object of the present invention is to provide a link mechanism capable of changing the stiffness of a joint by a simple configuration.

To this end, the present invention provides a link mechanism having a first main link and a second main link that are coupled by a joint, including:

a pivot bar which has one end thereof pivotably attached at a position in the second main link; the position opposing the joint, along a plane that is orthogonal to a rotating shaft of the joint, and which extends toward the joint from the one end;

a slider provided on the pivot bar slidably along the pivot bar;

a moving mechanism which has one end thereof coupled to the joint and the other end thereof coupled to the slider to move the slider; and an elastic member which is connected to the pivot bar and the second main link to urge the pivot bar toward a neutral position.

According to the present invention, the link mechanism includes: a pivot bar which has one end thereof pivotably attached at a position in the second main link, the position opposing the joint, along a plane that is orthogonal to the rotating shaft of the joint, and which extends toward the joint from the one end; a slider provided on the pivot bar slidably along the pivot bar; and an elastic member which is connected to the pivot bar and the second main link to urge the pivot bar toward a neutral position. Thus, the stiffness of the joint can be changed by a simple configuration by changing the position of the slider on the pivot bar.

Further, in the present invention, the moving mechanism preferably includes:

an A link system which is composed of an A-system first sublink having one end thereof connected to the joint and an A-system second sublink having one end thereof pivotably coupled to the slider, and in which the other end of the A-system first sublink and the other end of the A-system second sublink are mutually pivotably coupled to a support point;

a B link system which is composed of a B-system first sublink having one end thereof coupled to the joint and extending in a direction that is different from that of the A-system first sublink and a B-system second sublink having one end thereof pivotably coupled to the slider, and in which the other end of the B-system first sublink and the other end of the B-system second sublink are mutually pivotably coupled to a support point;

an A actuator which pivots the A-system first sublink;

a B actuator which pivots the B-system first sublink; and a control unit which controls drive of the A actuator and the B actuator.

With this arrangement, the moving mechanism includes the A link system comprised of the A-system first sublink and the A-system second sublink, and the B link system comprised of the B-system first sublink and the B-system second sublink, and the control unit simply causes the A link system to be pivoted by the A actuator and the B link system to be pivoted by the B actuator. This eliminates the need for an actuator adapted solely to change, for example, the position of the slider, so that the stiffness of the joint can be changed by a simple and light-weight configuration.

Further, in the present invention, the rotating shaft of the joint and the rotating shaft at the one end of the pivot bar are preferably placed in parallel.

With this arrangement, the rotating shaft of the joint and the rotating shaft at one end of the pivot bar are placed in parallel, so that a plane on which the second main link pivots with respect to the first main link and a plane on which the pivot bar pivots with respect to the second main link can be the same plane, thus enabling simpler placement.

Further, in the present invention, the control unit preferably controls the A actuator and the B actuator such that the A-system first sublink and the B-system first sublink pivot in a same direction.

With this arrangement, the driving force is transmitted to the slider through the A-system second sublink and the B-system second sublink by controlling the A actuator and the B actuator such that the A-system first sublink and the B-system first sublink pivot in the same direction, thus causing the slider to pivot about the joint while maintaining a distance from the rotating shaft to a support shaft. As the slider pivots about the joint, the driving force is transmitted to the second main link through the pivot bar and the elastic member, thereby enabling the second main link to pivot with respect to the joint.

Further, in the present invention, the control unit preferably controls the A actuator and the B actuator such that the A-system first sublink and the B-system first sublink pivot in directions that are opposite from each other.

With this arrangement, the A actuator and the B actuator are controlled such that the A-system first sublink and the B-system first sublink pivot in directions that are opposite from each other thereby to change the position of the slider on the pivot bar through the A-system second sublink and the B-system second sublink, thus making it possible to change the stiffness of the joint.

Further, in the present invention, the control unit preferably controls the A actuator and the B actuator such that a pivoting angle of the A-system first sublink and a pivoting angle of the B-system first sublink are pivoting angles that are different from each other.

With this arrangement, the control unit controls the A actuator and the B actuator such that the A-system first sublink and the B-system first sublink pivot in the same direction and the pivoting angles thereof are different from each other, thereby making it possible to pivot the second main link with respect to the joint and to change the stiffness of the joint. Further, the control unit controls the A actuator and the B actuator such that the A-system first sublink and the B-system first sublink pivot in the directions that are opposite from each other and the pivoting angles thereof are different from each other, thereby making it possible to change the stiffness of the joint and to pivot the second main link with respect to the joint.

DESCRIPTION OF THE PREFERRED EMBODIMENTS

Figure 1:
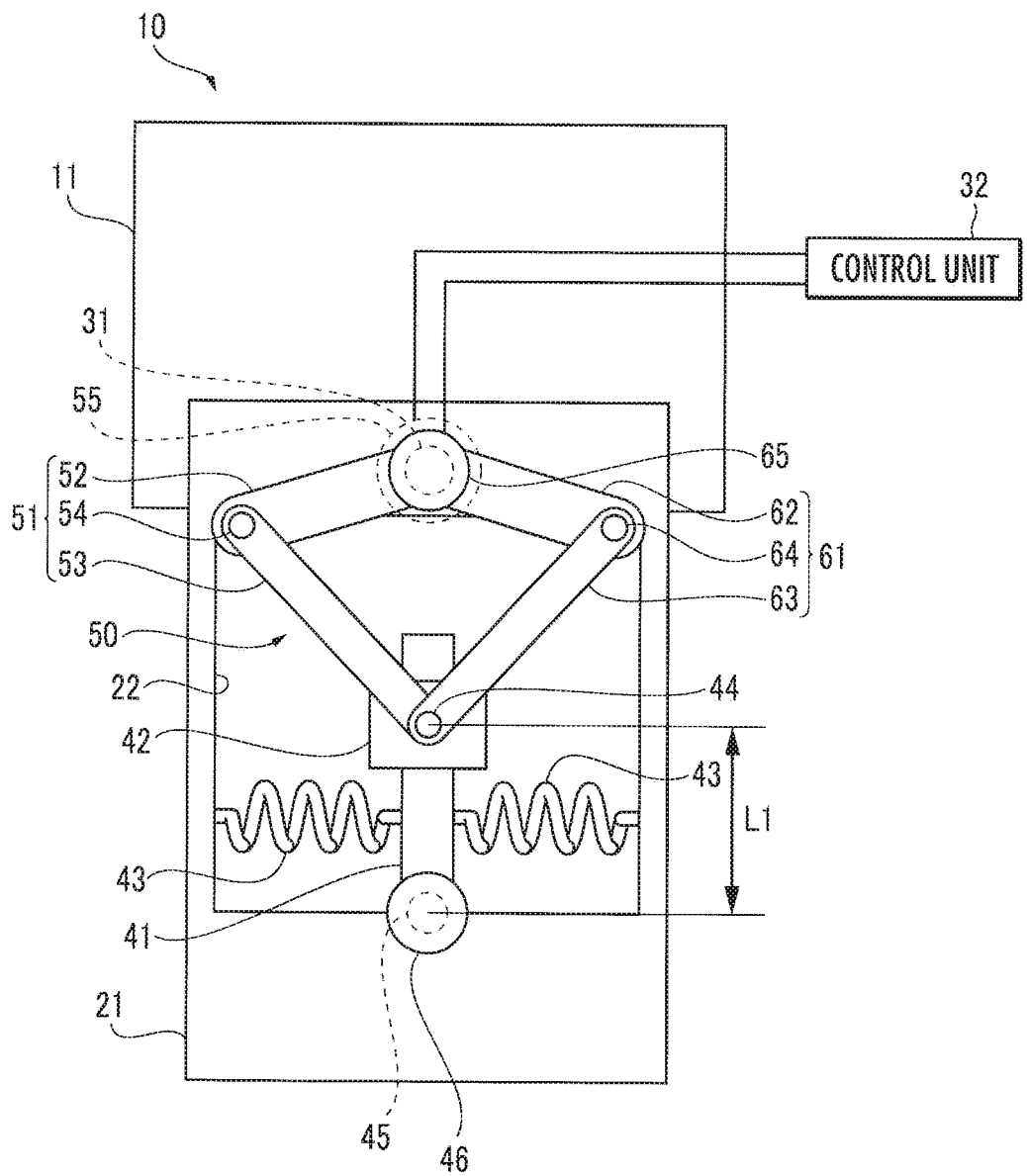
FIG. 1 is a front view illustrating a link mechanism in accordance with the present invention.

Referring to the accompanying drawings, a link mechanism 10 according to an embodiment of the present invention will be described. FIG. 1 to FIG. 3 conceptually illustrate the configuration of the link mechanism 10. As illustrated in FIG. 1, in the link mechanism 10, a first main link 11 and a second main link 21 are coupled by a joint 31.

The first main link 11 is, for example, a rectangular member, and the joint 31 is placed at the center of an edge part thereof that is adjacent to the second main link 21. The second main link 21 is, for example, a frame-shaped member, and the joint 31 is placed at the center of an edge frame member thereof that is adjacent to the first main link 11. The second main link 21 has an opening 22 formed close to the joint 31.

The link mechanism 10 has a pivot bar 41 which has one end thereof pivotably installed at the position in the second main link 21, the position opposing the joint 31 of the second main link 21, with the opening 22 located therebetween, and along a plane that is orthogonal to the rotating shaft of the joint 31. The pivot bar 41 extends from the one end toward the joint 31. Further, the link mechanism 10 has a slider 42 which is provided on the pivot bar 41 slidably along the pivot bar 41.

Further, the link mechanism 10 includes a moving mechanism 50, which has one end thereof coupled to the joint 31 and the other end thereof coupled to the slider 42 and which moves the slider 42, and compression springs acting as elastic members 43, which are connected to the pivot bar 41 and the second main link 21 and which urge the pivot bar 41 toward a neutral position.

A description will now be given of the moving mechanism 50. The moving mechanism 50 has an A link system 51 and a B link system 61.

The A link system 51 is comprised of an A-system first sublink 52 having one end thereof coupled to the joint 31 and an A-system second sublink 53 having one end thereof pivotally coupled to a support shaft 44 of the slider 42. The other end of the A-system first sublink 52 and the other end of the A-system second sublink 53 are coupled at a support point 54 in a mutually pivotable manner.

The B link system 61 is comprised of a B-system first sublink 62, which has one end thereof coupled to the joint 31 and which extends in a direction that is different from that of the A-system first sublink 52, and a B-system second sublink 63, which has one end thereof pivotably coupled to the support shaft 44 of the slider 42. The other end of the B-system first sublink 62 and the other end of the B-system second sublink 63 are coupled at a support point 64 in the mutually pivotable manner.

Further, the moving mechanism 50 includes an A actuator 55, which is provided on the joint 31 and which pivots the A-system first sublink 52, a B actuator 65, which is provided on the joint 31 coaxially with the A actuator 55 and which pivots the B-system first sublink 62, and a control unit 32, which controls the drive of the A actuator 55 and the B actuator 65. The rotating shaft of the joint 31 and a rotating shaft 45 of a pivot mechanism 46 of the pivot bar 41 are placed in parallel. The A actuator 55 and the B actuator 65 are motors. In the embodiment, although the A actuator 55 and the B actuator 65 are motors, the A actuator 55 and the B actuator 65 are not limited thereto, and the A actuator 55 and the B actuator 65 may alternatively be cylinders. The A actuator 55 and the B actuator 65 may take any forms insofar as the A actuator 55 and the B actuator 65 are capable of pivoting the A-system first sublink 52 and the B-system first sublink 62.

The following will describe a case where the rotating shaft of the A actuator 55 and the rotating shaft of the B actuator 65 are coaxially coupled to the rotating shafts of the A-system first sublink 52 and the B-system first sublink 62, and the rotating shafts of the A actuator 55 and the B actuator 65 coincide with the rotating shafts of the A-system first sublink 52 and the B-system first sublink 62. Alternatively, however, the rotating shaft of the A actuator 55 and the rotating shaft of the B actuator 65 may not be provided coaxially with the rotating shafts of the A-system first sublink 52 and the B-system first sublink 62, and the A actuator 55 and the B actuator 65 may be provided to pivot the A-system first sublink 52 and the B-system first sublink 62 through a gear or the like.

The link mechanism 10 rotates the A actuator 55 and the B actuator 65 in the same direction and pivots the A-system first sublink 52 and the B-system first sublink 62 in the same direction about the joint 31, thereby pivoting the second main link 21 about the joint 31 with respect to the first main link 11. Further, the link mechanism 10 rotates the A actuator 55 and the B actuator 65 in opposite directions and pivots the A-system first sublink 52 and the B-system first sublink 62 about the joint 31 in opposite directions, thereby moving the slider 42 along the pivot bar 41.

A detailed description will now be given of the operation for pivoting the foregoing second main link 21 of the link mechanism 10.

Figure 2A:
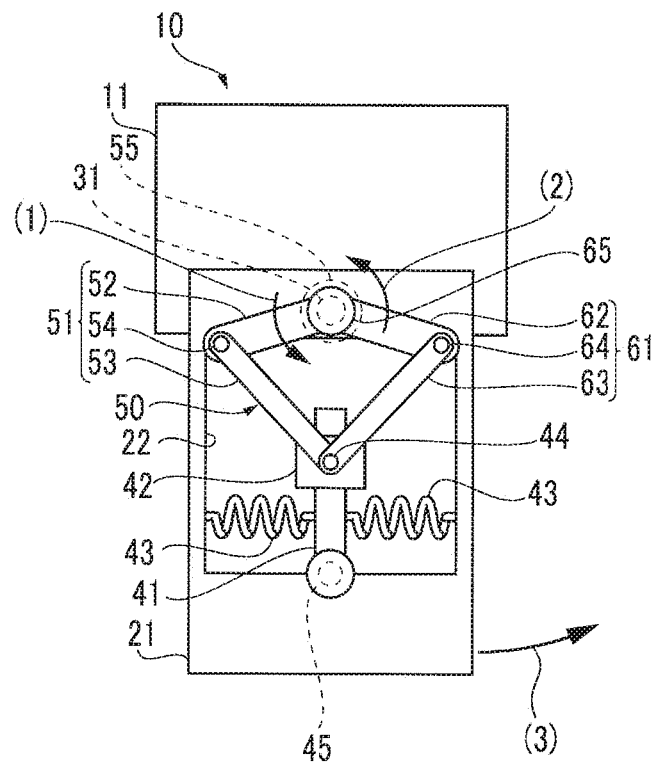
FIG. 2A is an operation diagram illustrating the link mechanism in a stationary state.
Figure 2B:
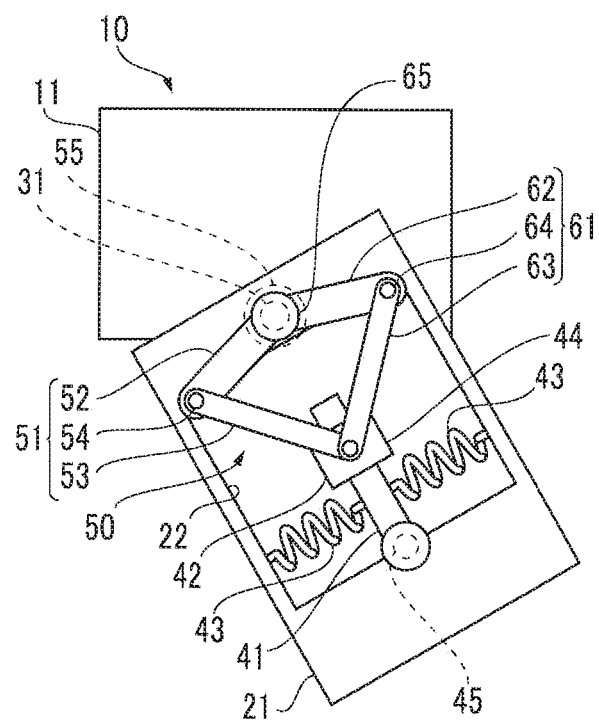
FIG. 2B is an operation diagram of the link mechanism observed when the A-system first sublink and the B-system first sublink have been pivoted in the same direction.

Referring to FIG. 2A, the pivot bar 41 is provided on the second main link 21 such that the pivot bar 41 is pivotable through the rotating shaft 45. The distance from the rotating shaft 45 to the support shaft 44 of the slider 42 is denoted by L1.

The A actuator 55 is driven in a counterclockwise direction (counterclockwise in the drawing) to pivot the A-system first sublink 52 in the counterclockwise direction with respect to the joint 31, as indicated by an arrow (1). The B actuator 65 is driven in the counterclockwise direction (counterclockwise in the drawing) to pivot the B-system first sublink 62 in the counterclockwise direction with respect to the joint 31, as indicated by an arrow (2). At this time, the pivoting angle of the A-system first sublink 52 and the pivoting angle of the B-system first sublink 62 are the same.

Then, the driving force is transmitted to the slider 42 through the A-system second sublink 53 and the B-system second sublink 63, and the slider 42 pivots about the joint 31 while maintaining the distance L1 from the rotating shaft 45 to the support shaft 44. The pivoting of the slider 42 about the joint 31 causes the driving force to be transmitted to the second main link 21 through the pivot bar 41 and the elastic members 43, and the second main link 21 pivots in the counterclockwise direction with respect to the joint 31, as indicated by an arrow (3), thus setting the state illustrated in FIG. 2B.

In the embodiment, the A actuator 55 and the B actuator 65 are driven in the counterclockwise direction and the A-system first sublink 52 and the B-system first sublink 62 are pivoted counterclockwise with respect to the joint 31. If the A actuator 55 and the B actuator 65 are driven in the clockwise direction (clockwise in the drawing) to pivot the A-system first sublink 52 and the B-system first sublink 62 in the clockwise direction with respect to the joint 31, then the second main link 21 pivots clockwise with respect to the joint 31. Further, although the distance from the rotating shaft 45 to the support shaft 44 has been set to L1 in the embodiment, the slider 42 will act in the same manner even if the distance from the rotating shaft 45 to the support shaft 44 is changed. Further, the A actuator 55 and the B actuator 65 are fixed to the first main link 11.

Further, in the link mechanism 10 of the present embodiment, when the joint 31 is driven, the driving forces of the A actuator 55 and the B actuator 65 are transmitted to the single pivot bar 41 and the torque values will be totaled.

A description will now be given of the operation for changing the stiffness of the joint 31 of the link mechanism 10 described above.

Figure 3A:
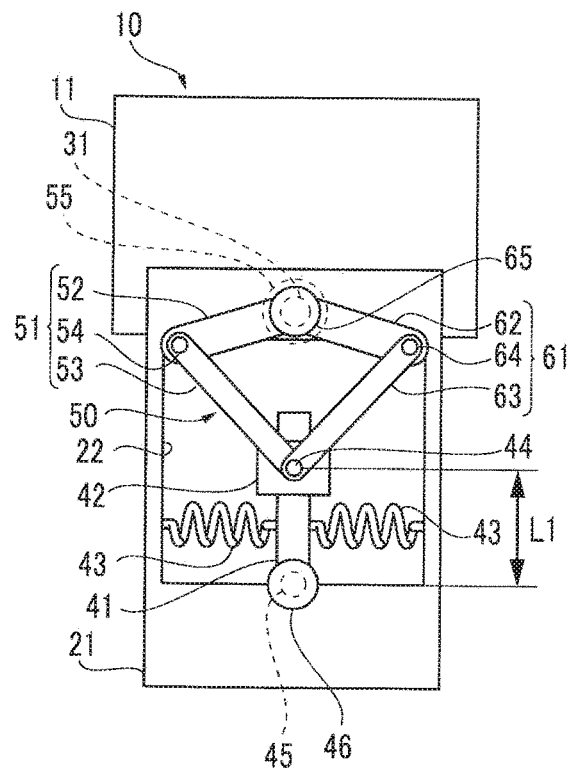
FIG. 3A is an operation diagram illustrating a link mechanism having lower stiffness.
Figure 3B:
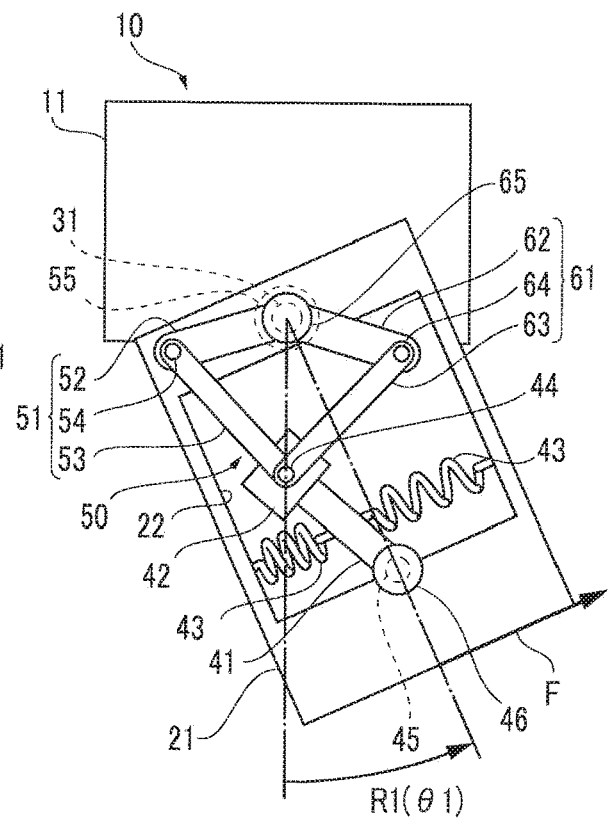
FIG. 3B is an operation diagram illustrating the link mechanism having the lower stiffness to which an external force has been applied.

Referring to FIG. 3A, the slider 42 has the distance L1 from the rotating shaft 45 to the support shaft 44. In this case, if the second main link 21 is subjected to an external force F, then the pivot bar 41 pivots about the rotating shaft 45 and the second main link 21 pivots about the joint 31 by an arc length R1 (pivoting angle θ1), as illustrated in FIG. 3B.

Figure 3C:
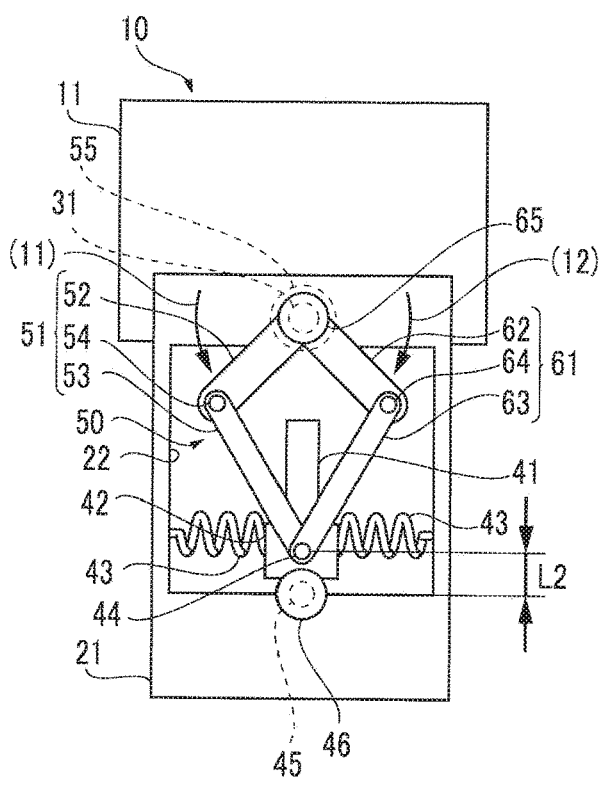
FIG. 3C is an operation diagram illustrating a link mechanism having higher stiffness.

Then, as illustrated in FIG. 3C, the A actuator 55 is driven in the counterclockwise direction, and the A-system first sublink 52 is pivoted in the counterclockwise direction with respect to the joint 31, as indicated by an arrow (11). The B actuator 65 is driven in the clockwise direction, and the B-system first sublink 62 is pivoted in the clockwise direction with respect to the joint 31, as indicated by an arrow (12). At this time, the pivoting angle of the A-system first sublink 52 and the pivoting angle of the B-system first sublink 62 are the same. The slider 42 moves along the pivot bar 41, and the distance from the rotating shaft 45 to the support shaft 44 becomes L2. When a force in a direction for the pivot bar 41 of the slider 42 to pivot is applied, if the distance L2 from the rotating shaft 45 to the support shaft 44 becomes smaller than L1 (L2<L1), then a larger force is required to move the pivot bar 41 against the urging force of the elastic members 43, which urge the pivot bar 41 toward the neutral position, so that the stiffness of the joint 31 increases.

Figure 3D:
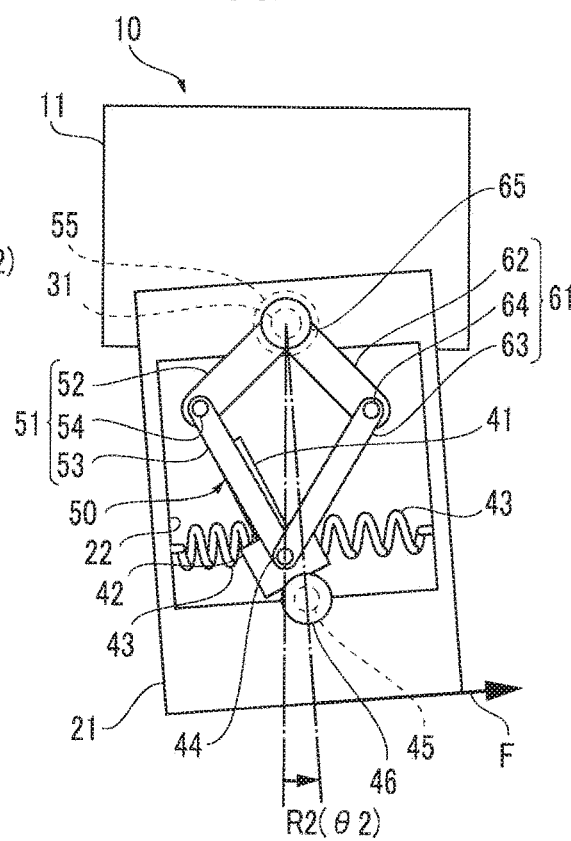
FIG. 3D is an operation diagram illustrating the link mechanism having the higher stiffness to which an external force has been applied.

As illustrated in FIG. 3D, when the second main link 21 is subjected to the external force F, the pivot bar 41 pivots, causing the second main link 21 to pivot by an arc length R2 (pivoting angle θ2). The stiffness of the joint 31 in the state illustrated in FIG. 3D is higher than that in the state illustrated in FIG. 3B. Hence, even if the second main link 21 is subjected to an external force F of the same magnitude, the arc length R2, which indicates the moving distance of the second main link 21, becomes smaller than R1 (i.e. the pivoting angle θ2 becomes smaller than θ1).

Thus, when setting the joint 31 to have lower stiffness, the distance from the rotating shaft 45 to the support shaft 44 can be increased by moving the slider 42. On the other hand, when setting the joint 31 to have higher stiffness, the slider 42 is moved to decrease the distance from the rotating shaft 45 to the support shaft 44, thus enabling the stiffness of the joint 31 to be easily adjusted. Further, if the first main link 11 is regarded as a thigh, the second main link 21 as a shin, the joint 31 as a knee, and the slider 42 as a bush, then it can be said that the stiffness of the knee can be changed by changing the position of the bush.

As described above, the link mechanism 10 according to the present embodiment adjusts the drive of the joint 31 and the stiffness of the joint 31 by the two actuators, the A actuator 55 and the B actuator 65. This eliminates the need for a separate stiffness adjustment actuator for changing the stiffness, thus permitting a reduction in weight as a whole. Further, in a so-called parallel mechanism type like the present embodiment, the torque values of the two actuators, 55 and 65, can be totaled when driving the joint 31. This makes it possible to relatively reduce the sizes and weights of the actuators with the same outputs, as compared with a case where the joint 31 is driven by a single actuator.

The following will describe the advantageous effects of the present invention.

The link mechanism 10 according to the present invention includes the pivot bar 41 which has one end thereof pivotably attached at a position in the second main link 21, the position opposing the joint 31, and the other end thereof extending toward the joint 31, the slider 42 provided on the pivot bar 41 slidably along the pivot bar 41, and the elastic members 43 which are connected to the pivot bar 41 and the second main link 21 and which urge the pivot bar 41 toward the neutral position. Hence, the stiffness of the joint 31 can be easily changed by the simple configuration by changing the position of the slider 42 on the pivot bar 41.

Further, the moving mechanism 50 includes the A link system 51 comprised of the A-system first sublink 52 and the A-system second sublink 53 and the B link system 61 comprised of the B-system first sublink 62 and the B-system second sublink 63, and the control unit simply pivots the A link system 51 by the A actuator 55 and pivots the B link system 61 by the B actuator 65. Hence, an actuator dedicated to, for example, changing the position of the slider 42 is unnecessary, thus making it possible to change the stiffness of the joint by the simple configuration. Further, higher stiffness of the joint 31 can be obtained by the small actuators having small driving forces by using leverage accomplished by changing the position of the slider 42 on the pivot bar 41, thus enabling the actuators to be made smaller and lighter in weight.

Further, the rotating shaft of the joint 31 and the rotating shaft at one end of the pivot bar 41 are placed in parallel, so that the plane on which the second main link 21 pivots with respect to the first main link 11 and the plane on which the pivot bar 41 pivots with respect to the second main link 21 can be made the same plane, thus enabling simpler placement.

Further, the control unit 32 controls the A actuator 55 and the B actuator 65 such that the A-system first sublink 52 and the B-system first sublink 62 pivot in the same direction. This causes the driving force to be transmitted to the slider 42 through the A-system second sublink 53 and the B-system second sublink 63, and the slider 42 pivots about the joint 31 while maintaining the distance from the rotating shaft 45 to the support shaft 44. As the slider 42 pivots about the joint 31, the driving force is transmitted to the second main link 21 through the pivot bar 41 and the elastic members 43, thus enabling the second main link 21 to pivot with respect to the joint 31.

Further, the control unit 32 controls the A actuator 55 and the B actuator 65 such that the A-system first sublink 52 and the B-system first sublink 62 pivot in the directions that are opposite from each other, thereby changing the position of the slider 42 on the pivot bar 41 through the A-system second sublink 53 and the B-system second sublink 63, thus making it possible to change the stiffness of the joint 31.

Further, the control unit 32 controls the A actuator 55 and the B actuator 65 such that the A-system first sublink 52 and the B-system first sublink 62 pivot in the same direction and the pivoting angles thereof are different from each other. This makes it possible to pivot the second main link 21 with respect to the joint 31 and to change the stiffness of the joint 31. Further, the control unit 32 controls the A actuator 55 and the B actuator 65 such that the A-system first sublink 52 and the B-system first sublink 62 pivot in the directions that are opposite from each other and the pivoting angles thereof are different from each other. This makes it possible to change the stiffness of the joint 31 and to pivot the second main link 21 with respect to the joint 31.

In the embodiment, the shafts of the A actuator 55 and the B actuator 65 are placed to coincide with the shaft of the joint 31; however, the present invention is not limited thereto; and there are no restrictions on the places and the attitudes of the A actuator 55 and the B actuator 65 insofar as the A-system first sublink 52 can be pivoted by the A actuator 55 and the B-system first sublink 62 can be pivoted by the B actuator 65.

Further; in the embodiment; the length of the A-system first sublink 52 and the length of the B-system first sublink 62 are set to be the same, the length of the A-system second sublink 53 and the length of the B-system second sublink 63 are set to be the same, and the A link system 51 and the B link system 61 are made symmetrical; however, the present invention is not limited thereto. Alternatively, the length of the A-system first sublink 52 and the length of the B-system first sublink 62 may be set to be different, the length of the A-system second sublink 53 and the length of the B-system second sublink 63 may be also set to be different, and the A link system 51 and the B link system 61 may be arranged to be asymmetrical.

Further, in the embodiment illustrated in FIG. 3A to FIG. 3D, the pivoting angle of the A-system first sublink 52 and the pivoting angle of the B-system first sublink 62 are set to be the same; however, the present invention is not limited thereto. Alternatively, the pivoting angle of the A-system first sublink 52 and the pivoting angle of the B-system first sublink 62 may be set to be different.

Further, in the embodiment, the elastic members 43 are formed of compression springs; however, the present invention is not limited thereto. The elastic members 43 may alternatively be formed of tensile springs, leaf springs, rubber or the like, and may be formed of any other materials insofar as the material is capable of urging the pivot bar 41 to the neutral position. Further, there are no restrictions on the place where the elastic members 43 are disposed, insofar as the place enables the elastic members 43 to urge the pivot bar 41 to the neutral position.

DESCRIPTION OF REFERENCE NUMERALS

10 Link mechanism
11 First main link
21 Second main link
31 Joint
32 Control unit
41 Pivot bar
42 Slider
43 Elastic member
44 Support shaft
45 Rotating shaft
50 Moving mechanism
51 A link system
52 A-system first sublink
53 A-system second sublink
54 Support point
55 A actuator
61 B link system
62 B-system first sublink
63 B-system second sublink
64 Support point
65 B actuator

What is claimed is:

1. A link mechanism having a first main link and a second main link that are coupled by a joint, comprising:
    a pivot bar which has one end thereof pivotably attached at a position in the second main link, the position opposing the joint, along a plane that is orthogonal to a rotating shaft of the joint, and which extends toward the joint from the one end;
    a slider provided on the pivot bar slidably along the pivot bar;
    a moving mechanism which has one end thereof coupled to the joint and the other end thereof coupled to the slider to move the slider; and
    an elastic member which is connected to the pivot bar and the second main link to urge the pivot bar toward a neutral position.

2. The link mechanism according to claim 1, wherein the moving mechanism includes:
    an A link system which is composed of an A-system first sublink having one end thereof connected to the joint and an A-system second sublink having one end thereof pivotably coupled to the slider, and in which the other end of the A-system first sublink and the other end of the A-system second sublink are mutually pivotably coupled to a support point;
a B link system which is composed of a B-system first sublink having one end thereof coupled to the joint and extending in a direction that is different from that of the A-system first sublink and a B-system second sublink having one end thereof pivotably coupled to the slider, and in which the other end of the B-system first sublink and the other end of the B-system second sublink are mutually pivotably coupled to a support point;
an A actuator which pivots the A-system first sublink;
a B actuator which pivots the B-system first sublink; and
a control unit which controls drive of the A actuator and the B actuator.

3. The link mechanism according to claim 1,
wherein the rotating shaft of the joint and a rotating shaft at the one end of the pivot bar are placed in parallel.

4. The link mechanism according to claim 2,
wherein the rotating shaft of the joint and a rotating shaft at the one end of the pivot bar are placed in parallel.

5. The link mechanism according to claim 2,
wherein the control unit controls the A actuator and the B actuator such that the A-system first sublink and the B-system first sublink pivot in a same direction.

6. The link mechanism according to claim 2,
wherein the control unit controls the A actuator and the B actuator such that the A-system first sublink and the B-system first sublink pivot in directions that are opposite from each other.

7. The link mechanism according to claim 5,
wherein the control unit controls the A actuator and the B actuator such that a pivoting angle of the A-system first sublink and a pivoting angle of the B-system first sublink are pivoting angles that are different from each other.

8. The link mechanism according to claim 6,
wherein the control unit controls the A actuator and the B actuator such that a pivoting angle of the A-system first sublink and a pivoting angle of the B-system first sublink are pivoting angles that are different from each other.

* * * * *